United States Patent
Zhu et al.

(10) Patent No.: US 8,311,034 B2
(45) Date of Patent: Nov. 13, 2012

(54) METHOD, APPARATUS AND NETWORK SYSTEM FOR MAKING TERMINATING NETWORK DOMAIN SELECTION

(75) Inventors: Dongming Zhu, Shenzhen (CN); Xiaoqin Duan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 543 days.

(21) Appl. No.: 12/167,522

(22) Filed: Jul. 3, 2008

(65) Prior Publication Data

US 2008/0268819 A1 Oct. 30, 2008

Related U.S. Application Data

(63) Continuation of application No. PCT/CN2007/000096, filed on Jan. 10, 2007.

(30) Foreign Application Priority Data

Jan. 10, 2006 (CN) .......................... 2006 1 0000278

(51) Int. Cl.
*H04L 12/28* (2006.01)
*H04L 12/50* (2006.01)
*H04L 12/66* (2006.01)
(52) U.S. Cl. ........................................ 370/352; 370/389
(58) Field of Classification Search ........................ None
See application file for complete search history.

(56) References Cited

U.S. PATENT DOCUMENTS

| | | | |
|---|---|---|---|
| 5,210,874 A | 5/1993 | Karger | |
| 7,359,373 B2 * | 4/2008 | Kuusinen et al. | 370/352 |
| 2001/0039576 A1 | 11/2001 | Kanada | |
| 2004/0190498 A1 * | 9/2004 | Kallio et al. | 370/352 |
| 2004/0252673 A1 | 12/2004 | Ejzak et al. | |
| 2005/0025047 A1 | 2/2005 | Bodin et al. | |
| 2005/0041787 A1 | 2/2005 | Casey et al. | |
| 2005/0058125 A1 * | 3/2005 | Mutikainen et al. | 370/354 |
| 2005/0071455 A1 | 3/2005 | Collins | |
| 2005/0083955 A1 | 4/2005 | Guichard et al. | |
| 2007/0149166 A1 * | 6/2007 | Turcotte et al. | 455/404.1 |

(Continued)

FOREIGN PATENT DOCUMENTS

CN 1391396 A 1/2003

(Continued)

OTHER PUBLICATIONS

3rd Generation Partnership Project; Technical Specification Group Services and System Aspects; Identification of Communication Services in IMS (Release 7)—3GPP TR 23.816 v1.0.0, Nov. 2005, entire document.*

(Continued)

*Primary Examiner* — Chirag G Shah
*Assistant Examiner* — Suk Jin Kang
(74) *Attorney, Agent, or Firm* — Huawei Technologies Co., Ltd.

(57) ABSTRACT

A method for making a terminating network domain selection, applied in a network system including a CS network and an IMS. The method includes: receiving an IMS service request destined to a served user; judging whether the service request is appropriate to be delivered to the CS network according to a service category of the IMS service request, making a terminating network domain selection according to terminating network domain selection related factors and performing subsequent delivering processes according to the determination of the terminating network domain selection if determining that the IMS service request is appropriate to be delivered to the CS network. The present disclosure also discloses a communication apparatus and a network system.

20 Claims, 10 Drawing Sheets

U.S. PATENT DOCUMENTS

| | | | |
|---|---|---|---|
| 2007/0165612 A1* | 7/2007 | Buckley | 370/356 |
| 2007/0238466 A1* | 10/2007 | Buckley et al. | 455/445 |
| 2007/0238467 A1* | 10/2007 | Buckley et al. | 455/445 |
| 2007/0238468 A1* | 10/2007 | Buckley et al. | 455/445 |
| 2008/0268818 A1* | 10/2008 | Keller et al. | 455/414.1 |
| 2009/0144429 A1* | 6/2009 | Astrom | 709/227 |
| 2010/0034166 A1* | 2/2010 | Olvera-Hernandez | 370/331 |
| 2010/0159923 A1* | 6/2010 | Tanabe et al. | 455/432.1 |
| 2010/0177771 A1* | 7/2010 | Buckley et al. | 370/352 |

FOREIGN PATENT DOCUMENTS

| | | |
|---|---|---|
| CN | 1414775 A | 4/2003 |
| CN | 1543146 A | 11/2004 |
| CN | 1574985 A | 2/2005 |
| CN | 100459805 A | 7/2007 |
| CN | 100474854 A | 7/2007 |
| EP | 1487221 | 12/2004 |
| EP | 1596566 A1 | 11/2005 |
| KR | 20050076921 | 7/2005 |
| WO | WO-03047162 A2 | 6/2003 |
| WO | 2005011207 | 2/2005 |

OTHER PUBLICATIONS

European Search Report regarding Application No. 07702028.7/PCT/CN2007000096.

3rd Generation Partnership Project; Technical Specification Group Services and System Aspects; Voice Call Continuity between CS and IMS Study—3GPP TR 23.806 v7.0.0.

3rd Generation Partnership Project; Technical Specification Group Services and System Aspects; Voice Call Continuity (VCC) between Circuit Switched (CS) and IP Multimedia Subsystem (IMS); Stage 2 (Release 7)—3GPP TS 23.206 v7.1.0.

International Search Report for International Application No. PCT/CN2007/000096, dated Apr. 9, 2007, with English translation.

First Chinese Office Action regarding Application No. 200780000205.8. Mailed May 10, 2010. Translation provided by Huawei Technologies Co., Ltd.

Extended European Search Report regarding Application No. 07702029.5-1244 dated Nov. 17, 2008.

European Office Action regarding Application No. 07 702 029.5-1244 dated Jul. 17, 2009.

First Chinese Office Action regarding Application No. 200780000204.3 dated Mar. 10, 2010. Translation provided by Huawei Technologies Co., Ltd.

European Office Action regarding Application No. 07 702 028.7-2413 dated Dec. 12, 2008.

3rd Generation Partnership Project; Technical Specification Group Services and System Aspects; Voice Call Continuity between CS and IMS Study (Release 7). 3GPP TR 23.806 V7.0.0 (Dec. 2005).

Telecommunications and Internet Converged Services and Protocols for Advanced Networking (TISPAN); NGN Signalling Control Protocol; Communication Diversion (CDIV) PSTN/ISDN simulation services ETSI TS 183 004 V0.0.17.

PCT Search Report and Written Opinion regarding Application No. PCT/CN2007/000097 dated Apr. 26, 2007. Translation provided by Huawei Technologies Co., Ltd.

European Office Action regarding Application No. 07 702 028.7-2413, dated Nov. 17, 2010.

Chinese Rejection decision regarding Application No. 200780000205.8, dated Aug. 3, 2011. Translation provided by Huawei Technologies Co., Inc.

Second Chinese Office Action regarding Application No. 200780000205.8, mailed Apr. 12, 2011. Partial translation provided by Huawei Technologies Co., Ltd.

* cited by examiner

METHOD, APPARATUS AND NETWORK SYSTEM FOR MAKING TERMINATING NETWORK DOMAIN SELECTION

CROSS-REFERENCE TO RELATED APPLICATIONS

This application is a continuation of International Application No. PCT/CN2007/000096, filed Jan. 10, 2007. This application claims the benefit of Chinese Application No. 200610000278.4, filed Jan. 10, 2006. The disclosures of the above applications are incorporated herein by reference.

FIELD

The present disclosure relates to communication technologies, and particularly, to a method, an apparatus, and a network system for making a terminating network domain selection.

BACKGROUND

The statements in this section merely provide background information related to the present disclosure and may not constitute prior art.

Since Release 5 (R5) of the $3^{rd}$ Generation Partnership Project (3GPP), the Universal Mobile Telecommunications System (UMTS) core network has been divided into three subsystems: a Circuit Switched (CS) domain, a Packet Switched (PS) domain and an IP Multimedia Subsystem (IMS).

The CS domain is used for providing users with connections of circuit switched service. The CS domain includes:

a Mobile Switching Center (MSC) (which may be further divided into MSC server and CS-Media Gateway Function (CS-MGW)) for performing switching and signaling control functions in circuit switched services;

a Gateway Mobile Switching Center (GMSC) which is an MSC used for mobile user routing and addressing in a network, which may be integrated into the MSC or be an independent device;

an InterWorking Function which is closely connected to the MSC and used for interworking between a Public Land Mobile Network (PLMN) and an Integrated Service Digital Network (ISDN), a Public Switched Telephone Network (PSTN) or a Public Data Network (PDN), and mainly for converting the signaling; the specific functions of IWFs vary according to different services and networks.

The PS domain is used for providing users with connections of packet switched service. The PS domain includes: a General Packet Radio Service (GPRS) support node (GSN) (including Serving GSN (SGSN) and Gateway GSN (GGSN)) and a Border Gateway (BG).

The SGSN and GGSN is used for transmitting data packages for packet switched service users; the service GSN (SGSN) provides a connection between a Core Network and a Radio Access System such as Base Station Subsystem (BSS) or Radio Network Subsystem (RNS), performs the functions of mobility management and session management in packet switched data services and manages the mobility and communication services of a Mobile Station (MS) in a mobile network; the GGSN acts as an interface between a mobile communication system and other PDNs and further performs the function of querying location information; both the SGSN and the GGSN may provide charging information.

The Border Gateway (BG) is used for interworking between two GPRS networks and ensuring the security of network interworking.

In addition, the common functional entities shared by the CS domain and the PS domain include:

a Home Location Register/Authentication Center (HLR/AuC). The HLR is used for managing subscription data and location information. The subscription data includes at least one of: a Mobile Station International ISDN Number (MSISDN), an International Mobile Subscriber Identity (IMSI), a Packet Data Protocol Address (PDP ADDRESS), subscribed telephony services, supplementary services and so on. The location information may include: a Mobile Switching Center/Visitor Location Register (MSC/VLR) number, an SGSN number, or a Gateway Mobile Location Center (GMLC) address. The AuC is used for storing the authentication algorithm and key of a user.

The common functional entities shared by both a CS domain and a PS domain also include a Visitor Location Register (VLR) for processing various data of the subscribers currently visited, an Equipment Identity Register (EIR) for storing the user equipment identities such as an International Mobile station Equipment Identity (IMEI), and a Short Message Service Gateway MSC (SMS-GMSC/SMS IMSC).

The IMS is a subsystem added in the 3GPP R5 on the basis of the existing PS domain. The IMS employs the PS domain as a bearer channel for the transmission of its upper level control signaling and media data, adopts a Session Initiation Protocol (SIP) as an IMS service control protocol, and provides abundant multimedia services for subscribers by separating the service control from the bearer control, and by utilizing the characteristics of the SIP, i.e., simple, extensible and convenient for a media combination. The main functional entities of the IMS include: a Call Session Control Function (CSCF) for the control of subscriber's registration and session control, an Application Server (AS) for various kinds of service logic control, a Home Subscriber Server (HSS) for the management of the subscriber's subscription data in a centralized manner, and a Media Gateway Control Function (MGCF) and an IMS Media Gateway (IM-MGW) for the interworking between the IMS and the CS domain. A subscriber may access the IMS through a proxy CSCF (P-CSCF) in the visited network, and then a session control, a service triggering control and a service control interaction with an AS are performed by the serving CSCF (S-CSCF) of the home network. The HSS in the IMS, whose functionalities include those of the HLR, is the superset of the HLR. However, due to a factor of networking process and so on, the HSS of IMS and the HLR of CS/PS domain may be deployed as entities independent of each other in the practical networking projects.

The IMS architecture defined by 3GPP solves all the crucial operability problems of multimedia service over IP, such as roaming charging, QoS and security. Therefore, the architecture and corresponding idea are recognized by the industry. Both 3GPP2 and TISPAN define the corresponding IP multimedia network architecture and service systems according to a 3GPP model and with reference to the 3GPP model. Meanwhile, 3GPP has started researches on the Interworking of WLAN access with 3GPP system (I-WLAN), Fixed Broadband IMS access (FBI), and the all-IP network (AIPN) which supports multiple access technologies. A subscriber may access the IMS according to the subscription of the subscriber through access networks of different access technologies with a single multi-mode terminal or terminals of various types, to obtain unified multimedia services, including VoIP services. Both the 3GPP, which is responsible for researches on the specifications of GSM system and WCDMA system, and the 3GPP2, which is responsible for researches on the specifications of CDMA system and CDMA 2000 system, have approved a Voice Call Continuity (VCC) work item doing researches on the service continuity between a CS domain call in a GSM, CDMA, WCDMA or CDMA2000 system and a VoIP service provided by accessing the IMS through a WLAN, and put forward solutions to the problems, such as the terminating network domain selection between CS domain and the IMS when a user acts as a called user, and the domain transfer between the CS domain and the IMS due to the move of the terminal, so as to ensure the service continuity and thus meet the demand of network and service development.

In the case that a user having subscribed to a VCC service acts as a called user, it is required in the VCC work item that the terminating network domain, the network domain used to deliver the incoming voice call, be selected by performing a synthetical determination based on network domain selection related factors so as to provide better service experience such as ensuring a higher success ratio of connecting the called user, and selecting a method with better quality or fewer fees. The network domain selection related factors include at least one of: user's registration status in the CS domain, user's registration status in the IMS, service and subscription data, network selection policy or preference set by an operator or the user, the case whether there is an ongoing call in one domain, and the capability of IP Connectivity Access Network (IPCAN) via which accessing to the IMS.

Moreover, with the development of the research of the VCC work item, a static anchoring and IMS centralized control solution for performing CS-IMS bidirectional domain transfer has been selected. The basic idea of the solution is that an Application Server (AS) is assigned to a user as a Call Continuity Control Function (CCCF) in the home IMS of the user, and all the control signaling of a CS domain call and an IMS session related to the user are anchored in the AS. The CCCF controls the call connection between a VCC user and the opposite user in a Third-party Call Control (3PCC) manner and implements a domain transfer as requested by the VCC user. As shown in FIG. 1A, a call connection between a VCC user and an opposite user is segmented into two segments in an AS. The VCC user establishes a new connection with the AS in a transfer-in domain when a domain transfer is required. After the new connection is established successfully, the AS performs re-negotiation on the connection between the AS and the opposite user so as to enable the opposite user and the VCC user to perform voice interaction through the new connection. The CCCF controls the replacement of the two segments of sessions with the VCC user respectively in the transfer-in domain and transfer-out domain during a domain transfer process.

Thus, an incoming call destined to a user having subscribed to a "VCC" service is routed to an IMS first to perform the above anchoring in order to control a possible domain transfer in the subsequent call processes, and then an Network Domain Selection function implemented in the IMS (IMS-NeDS) selects the domain for delivering the incoming call to a VCC terminal based on the above network domain selection related factors, i.e., directly delivering the incoming call in the IMS or delivering the incoming call to a CS domain as shown in FIG. 1B.

Although the work item of VCC aims at only voice services, besides VoIP services, great varieties of multimedia services may be provided for users in an IMS, in other words, the service capability of the IMS is far richer than that of the CS domain. Therefore, a service request received in the IMS and destined to a VCC subscriber such as an IMS session establishment request for performing multimedia interaction may be not appropriate to be directly delivered to a CS domain for connecting a called user. Specifically, in accordance with the prior art, the multimedia service may fall back, and even it is possible that the desired multimedia service cannot be provided, thus resulting in a service failure, if a service request is directly delivered to the CS domain without taking the category of the service request, e.g., the media components included in an incoming IMS multimedia telephony session, into consideration.

Moreover with the in-depth study of a terminating network domain selection function, it has been gradually recognized by the industry that the terminating network domain selection function is universally applicable in the process of delivering an incoming service destined to a called user with an ability of accessing multiple domains, in other words, the application scope of the terminating network domain selection function has gone beyond the VCC work item. Correspondingly, the terminating network domain that may be selected by the terminating network domain selection function is not limited to a CS domain and an IMS any more, but also includes different IP access networks via which the IMS is accessed, and a PSTN and an ISDN which are jointly called Circuit Switched (CS) networks with the CS domain and also have service capabilities much different from those of the IMS (For the sake of concise description, the PSTN and the ISDN, and the CS domain in the GSM, CDMA, WCDMA and CDMA2000 system are jointly called CS networks hereinafter). Therefore, the terminating network domain selection function as a general function should not be limited to a voice service yet, but great varieties of multimedia services in the IMS and the service capabilities of the IMS different from those of the CS network should be fully taken into consideration so as to avoid the following case: the provided multimedia service may fall back, or even a desired multimedia service cannot be provided, thereby resulting in a failure of a service, since a service request is directly delivered to the CS network without taking the service category of the service request into consideration.

SUMMARY

Various embodiments provide a method, an apparatus and a network system for making a terminating network domain selection, so as to avoid that a service request is directly delivered to the CS network and thus the providing of the service is influenced.

A method for making a terminating network domain selection includes:

receiving an Internet Protocol Multimedia Subsystem (IMS) service request destined to a served user;

judging whether the IMS service request is appropriate to be delivered to a Circuit Switched (CS) network according to a service category of the IMS service request;

if the IMS service request is appropriate to be delivered to the CS network, making a terminating network domain selection and performing subsequent delivering processes according to a determination of the terminating network domain selection;

if the IMS service request is not appropriate to be delivered to the CS network, omitting the terminating network domain selection, or making the terminating network domain selection as directly determining to deliver the IMS service request in the IMS.

A communication apparatus includes:

means for receiving an Internet Protocol Multimedia Subsystem (IMS) service request destined to a served user;

means for judging whether the IMS service request is appropriate to be delivered to a Circuit Switched (CS) network according to the service category of the IMS service request;

means for acquiring a determination of a terminating network domain selection in the case that the IMS service request is appropriate to be delivered to the CS network, and determining to directly deliver the IMS service request to a called user in the IMS in the case that the IMS service request is not appropriate to be delivered to the CS network; and means for delivering the IMS service request to the called user.

A communication apparatus includes:

means for receiving a terminating network domain selection query request;

means for judging whether an IMS service request destined to a served user is appropriate to be delivered to a Circuit Switched (CS) network according to a service category of the IMS service request carried in the terminating network domain selection query request;

means for making a terminating network domain selection in the case that the IMS service request is appropriate to be delivered to the CS network, and directly determining to deliver the IMS service request to the called user in the IMS in the case that the IMS service request is not appropriate to be delivered to the CS network; and means for sending the determination of the terminating network domain selection to an entity having sent the terminating network domain selection query request.

A network system includes:

a network domain selection entity, adapted to make a terminating network domain selection according to network domain selection related factors upon receiving a query request for the determination of the terminating network domain selection; and a network domain selection query entity, adapted to judge a service category of an Internet Protocol Multimedia Subsystem (IMS) service request when receiving an IMS service request destined to a served user, query the network domain selection entity for a determination of the terminating network domain selection when determining that the IMS service request is appropriate to be delivered to a Circuit Switched (CS) network according to the service category, and perform the subsequent delivering processes of the IMS service request according to the determination of the terminating network domain selection.

A network system includes:

a network domain selection query entity, adapted to query the network domain selection entity for a determination of a terminating network domain selection upon receiving an Internet Protocol Multimedia Subsystem (IMS) service request destined to a served user, and perform subsequent delivering processes of the IMS service request according to the determination of the terminating network domain selection; and a network domain selection entity, adapted to make the terminating network domain selection according to at least a service category of the IMS service request and providing the network domain selection query entity with the determination of the terminating network domain selection.

In accordance with various embodiments, in a procedure of making a network domain selection in an IMS, based on the service category of the service request being handled, a terminating network domain selection between a CS network and the IMS is further made only for the service request appropriate to be delivered to the CS network according to the various network domain selection related factors. Thus, not only it may be ensured that a better service experience is provided for users and more effective utilization of network resources is implemented for operators, by fully using the capabilities of different networks and terminals with the flexible network domain selection function, but also it may be ensured that the provided service will not fall back due to the network capability difference between an IMS and a CS network in the case that the terminating network domain selection is the CS network. In accordance with the present disclosure, the service experience of users may be further improved.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 3, 4, 5, and 6 show flow charts for making a terminating network domain selection in accordance with various embodiments.

Figure 7:
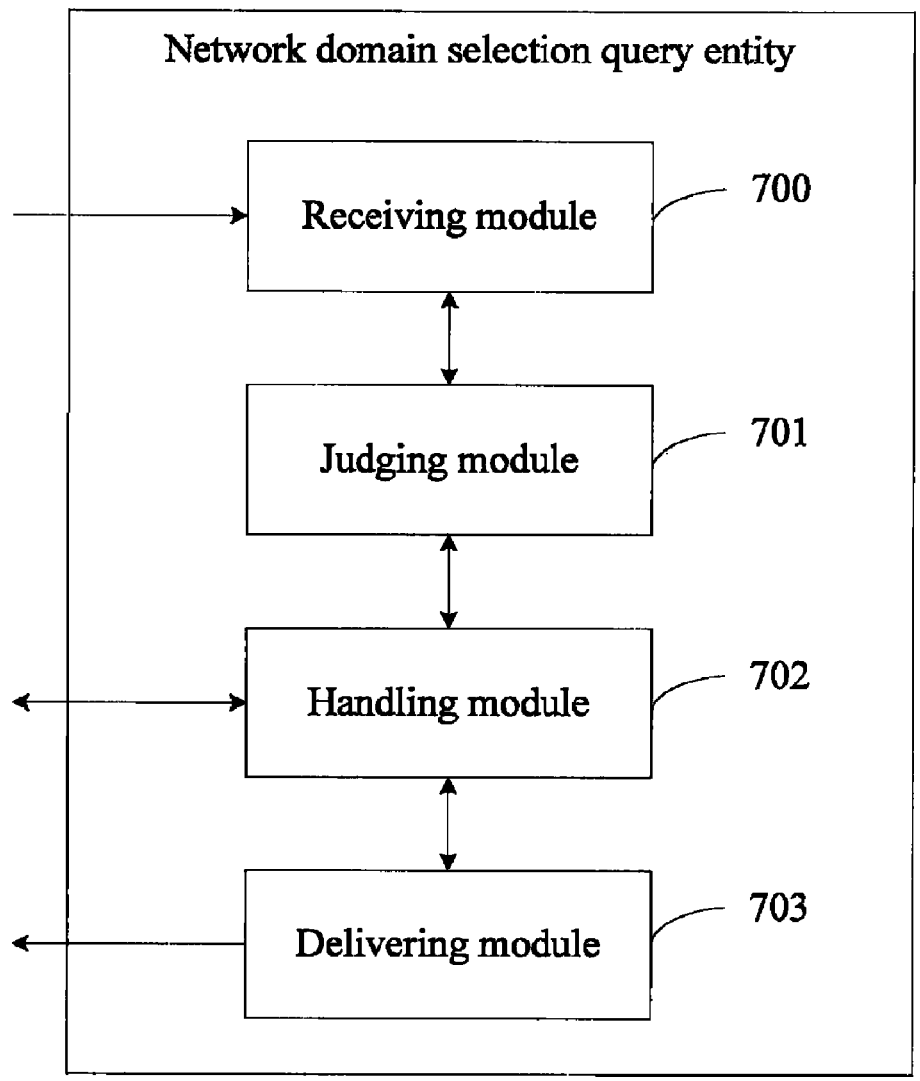

FIG. 7 shows a schematic diagram illustrating the structure of a network domain selection query entity in accordance with an embodiment.

Figure 8:
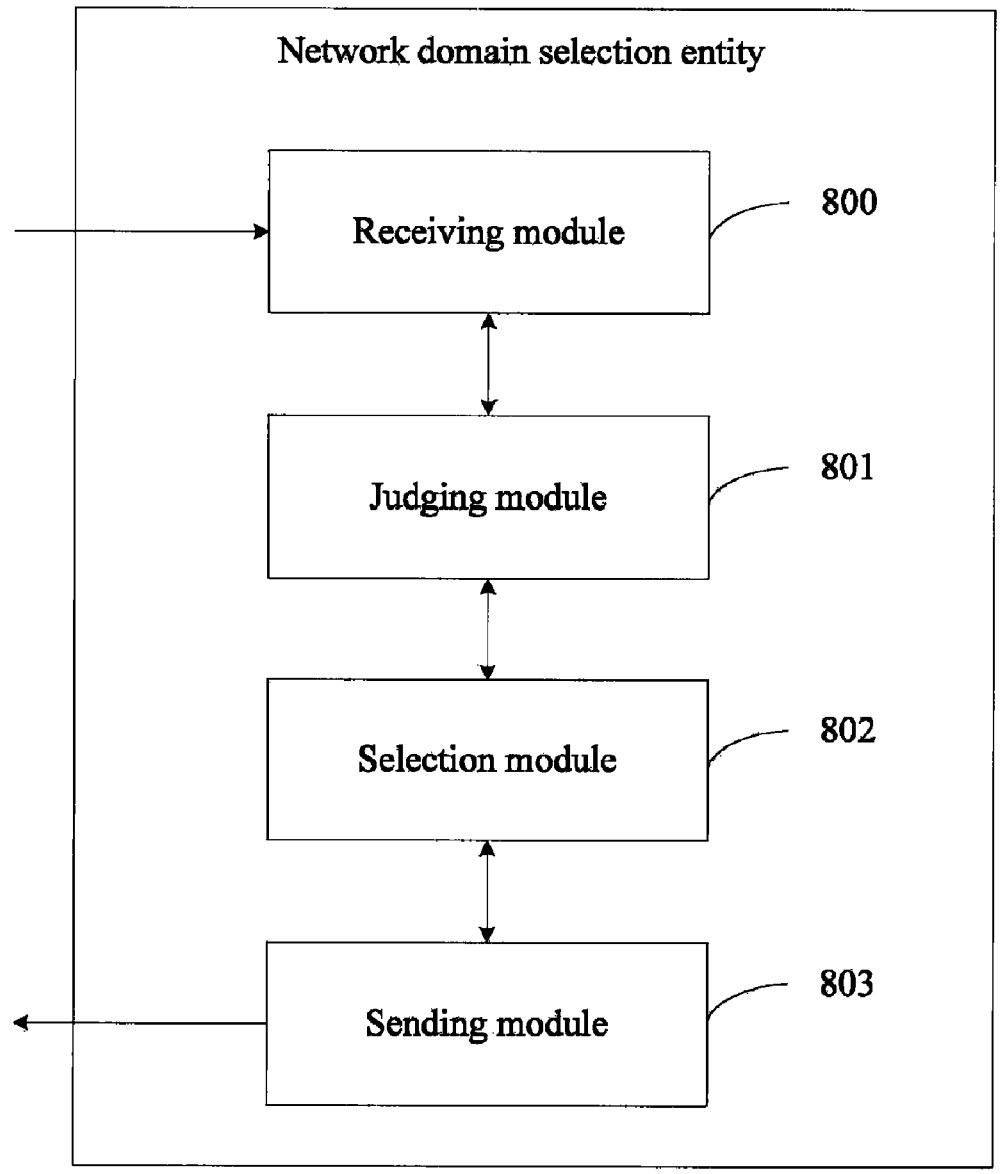

FIG. 8 shows a schematic diagram illustrating the structure of a network domain selection entity in accordance with another embodiment.

DETAILED DESCRIPTION

The following description is merely exemplary in nature and is not intended to limit the present disclosure, application, or uses.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Various embodiments are provided to avoid that the normal provision of a service is influenced due to a network service capability difference when an IMS service request being handled currently in an IMS is delivered to a CS network for connecting a called user. In accordance with the various embodiments, in the process of making a network domain selection by interacting between a network domain selection query entity and a network domain selection entity, it is judged whether the IMS service request is appropriate to be delivered to the CS network for connecting a called user according to the service category of the IMS service request, so as to determine whether or how to make a terminating network domain selection. For the IMS service request appropriate to be delivered to the CS network, the terminating network domain selection is further made according to various network domain selection related factors, and the subsequent delivering processes are performed according to the current determination of the terminating network domain selection. For the IMS service request not appropriate to be delivered to the CS network, the interaction for querying the determination of the terminating network domain selection is not performed any more, or the network domain selection entity directly determines that the service request should be delivered in the IMS.

The service category of an IMS service request may be determined according to a method name of the IMS service request and/or a Session Description Protocol (SDP) description carried in the IMS service request, or may be determined according to a special IMS Communication Service Identifier in the IMS service request. The judging whether an IMS service request is appropriate to be delivered to the CS network according to the service category may be implemented directly according to the method name of the IMS service request and/or the SDP description carried in the IMS service request, or the special IMS Communication Service Identifier in the IMS service request. Optionally alternatively, the judging also may be implemented according to a service category indication determined according to the method name of the IMS service request and/or the SDP description carried in the IMS service request, or determined according to the special IMS Communication Service Identifier in the IMS service request. Specifically, it is judged that the service request is appropriate to be delivered to the CS network if it is determined that the service request is for establishing a voice interaction of a VoIP service, or for establishing a video interaction that can be converted into a CS video service, or for establishing a multimedia interaction containing a voice component of the VoIP service. Otherwise, it is determined that the IMS service request is not appropriate to be delivered to the CS network.

Moreover, an operator may assign different user identifiers for different services of a user. For example, a dedicated user identifier may be assigned for a service appropriate to be delivered to the CS network. Thus, the service category of the service may also be judged according to a destination identifier in a service request of the service. Specifically, it is determined that the service request is appropriate to be delivered to the CS network if the destination identifier in the service request is the dedicated user identifier assigned for the service appropriate to be delivered to the CS network. Otherwise, it is determined that the service request is not appropriate to be delivered to the CS network.

However, although such a method for assigning different user identifiers to a user is feasible, more user identifier resources are occupied in this method and it is not convenient for an opposite user to call the user. Therefore, the former judging method is mainly adopted in the following embodiments.

Figure 1A:
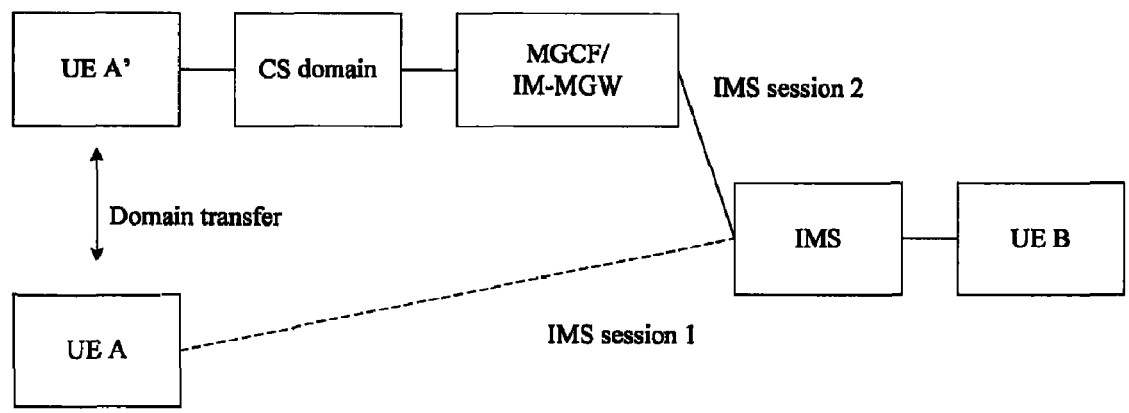
FIG. 1A shows a schematic diagram illustrating the implementation of VCC in an existing communication system.
Figure 1B:
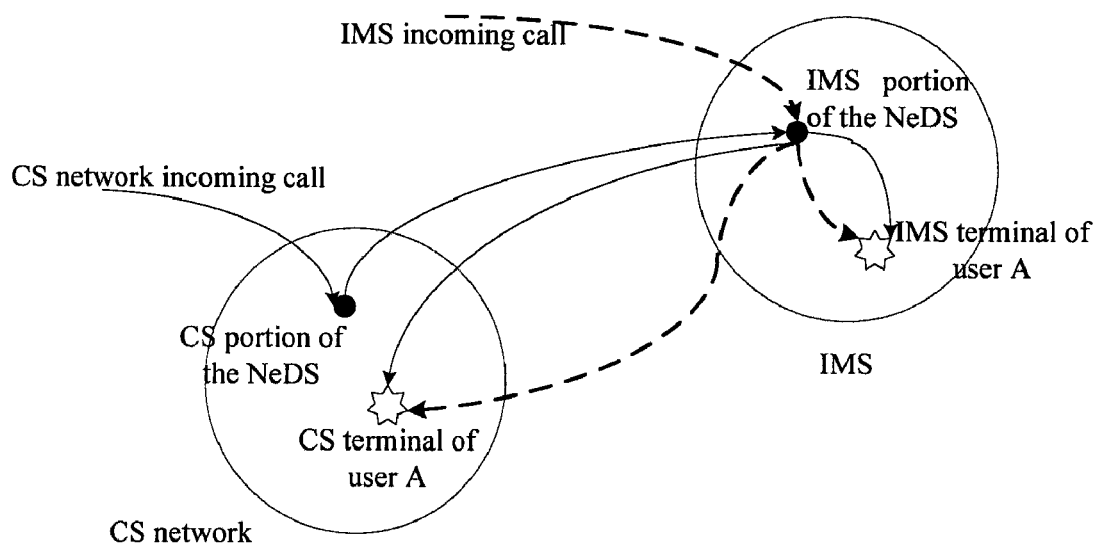
FIG. 1B shows a schematic diagram illustrating the process of making a terminating network domain selection in a centralized manner in an IMS in accordance with the related art.
Figure 2A:
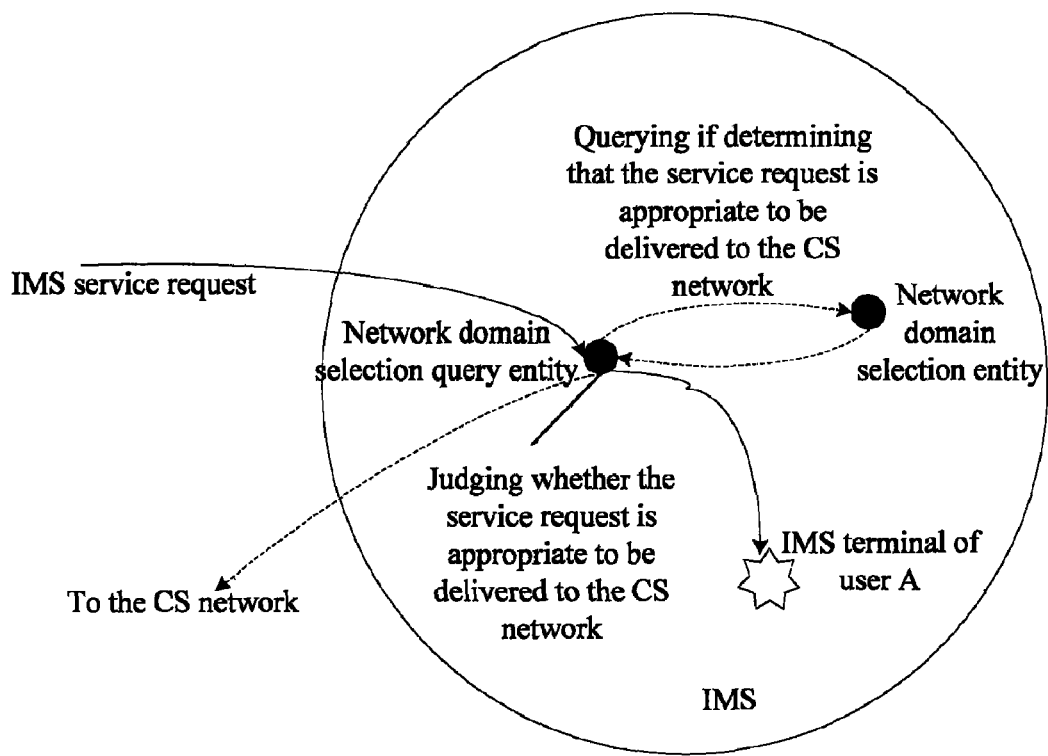
FIGS. 2A and 2B show schematic diagrams illustrating the network systems of an IMS in accordance with various embodiments.

As shown in FIG. 2A, in accordance with an embodiment, a network domain selection query entity may judge whether an IMS service request being handled is appropriate to be delivered to the CS network for connecting a called user. If it is judged that the IMS service request being handled is appropriate to be delivered to the CS network, the network domain selection query entity further queries the network domain selection entity for a determination of a terminating network domain selection and performs the subsequent delivering processes according to the determination of the terminating network domain selection. And if it is judged that the IMS service request being handled is not appropriate to be delivered to the CS network, the network domain selection query entity does not query for the determination of the network domain selection and directly delivers the IMS service request in the IMS according to the method defined in the existing standards.

Figure 2B:
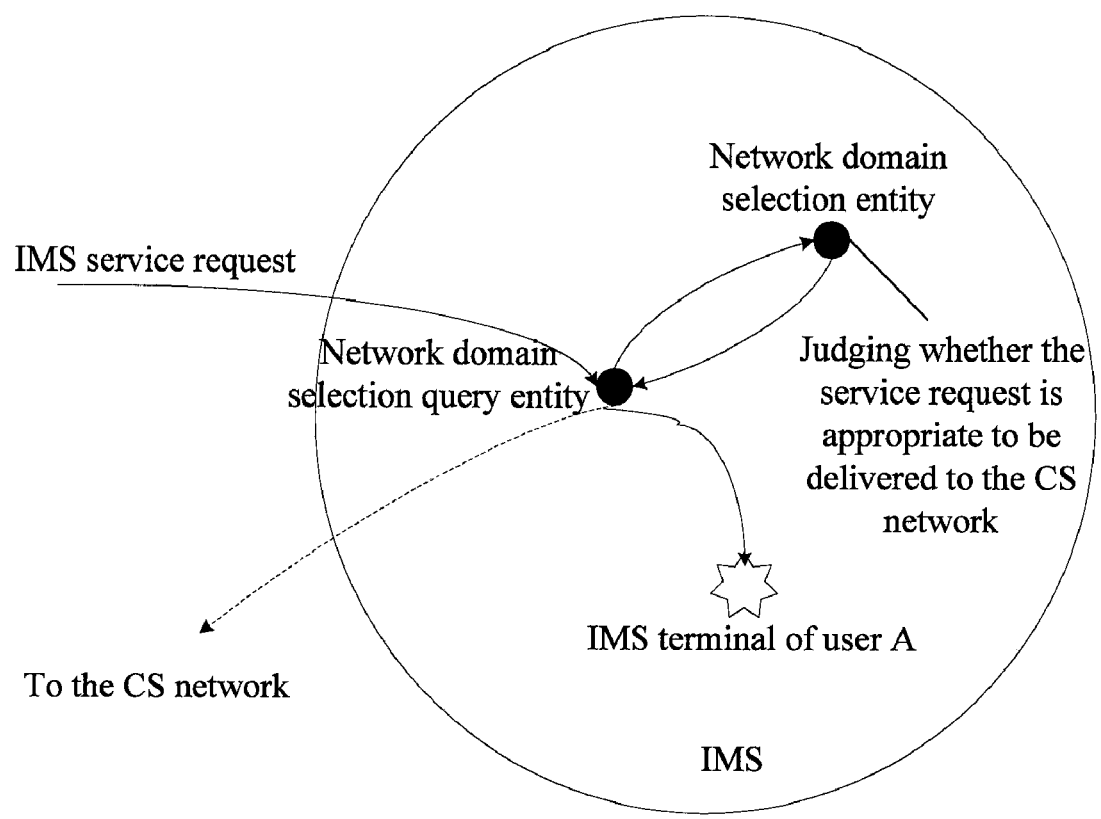

As shown in FIG. 2B, in accordance with another embodiment, a network domain selection entity also may judge whether an IMS service request being handled is appropriate to be delivered to a CS network for connecting a called user, when receiving a query request sent from a network domain selection query entity. If it is judged that the IMS service request being handled is appropriate to be delivered to the CS network, the network domain selection entity further makes a network domain selection according to various network domain selection related factors and returns the current determination of the network domain selection to the network domain selection query entity. And if it is judged that the IMS service request being handled is not appropriate to be delivered to the CS network, the network domain selection entity directly determines that the terminating network domain is the IMS without taking other factors into consideration, and returns the determination of terminating network domain selection to the network domain selection query entity.

The network domain selection query entity may be an I-CSCF at the network entrance of an IMS, or an S-CSCF assigned to a called user in the IMS, or an AS assigned to the called user in the IMS.

The I-CSCF, S-CSCF, or AS as a network domain selection query entity may interact with a network domain selection entity through a Diameter interface to query for the current determination of the terminating network domain selection. The network domain selection entity may be an independent network entity or be embedded in an HSS.

In the case that the network domain selection entity is embedded in an HSS and the network domain selection query entity is an I-CSCF, the I-CSCF may complete the query of the current determination of terminating network domain selection through an original Cx interface or an extended Cx interface together with original processes of querying for the route of a called user.

In the case that the network domain selection entity is embedded in an HSS and the network domain selection query entity is an S-CSCF, the S-CSCF may interact with the HSS to complete the query of the current determination of terminating network domain selection through an extended Cx interface after triggering a terminating side service of a user.

In the case that the network domain selection entity is embedded in an HSS and the network domain selection query entity is an AS, the AS may interact with the HSS to complete the query of the current determination of terminating network domain selection through an original Sh interface or an extended Sh interface together with processes of handling other services of a called user.

The network domain selection entity may also be an AS in an IMS in accordance with the present disclosure. In this case, the network domain selection query entity is an S-CSCF assigned to a called user. The S-CSCF as the network domain selection query entity interacts with the network domain selection entity through an IP multimedia Service Control (ISC) interface defined in existing standards to complete the querying for the current determination of terminating network domain selection.

The above different cases are described in the following embodiments, respectively.

Figure 3:
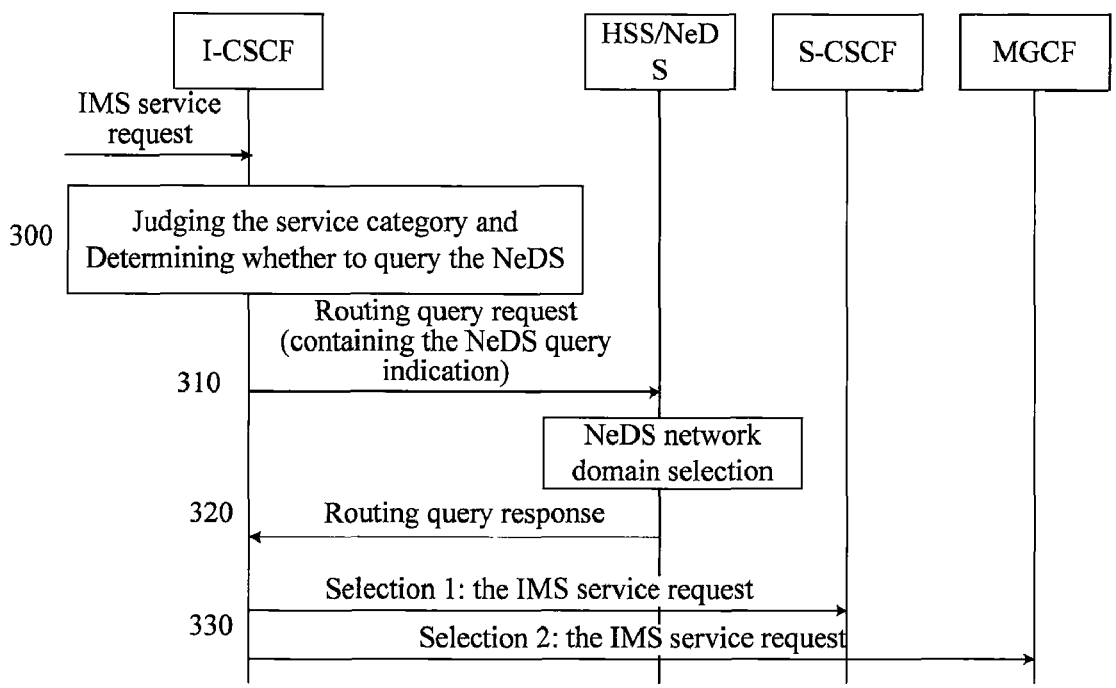

As shown in FIG. 3, the network domain selection query entity is an I-CSCF. The process for judging the service category by the I-CSCF and thus accomplishing the terminating network domain selection is described as follows.

Step 300: An I-CSCF in an IMS determines whether an IMS service request is appropriate to be delivered to a CS network for connecting a called user (The case that the IMS service request is appropriate to be delivered to the CS network is taken as an example in the subsequent processes in this embodiment) according to a method name of the IMS service request and an SDP description carried in the IMS service request, after receiving the IMS service request.

It is to be noted that, in this step, the I-CSCF may judge that the IMS service request is not appropriate to be delivered to the CS network according to only the method name of the IMS service request such as Notify and Info. However, if the I-CSCF cannot judge exactly whether the IMS service request is appropriate to be delivered to the CS network according to only the method name of the IMS service request, for example, when the received IMS service request is an INVITE message, the I-CSCF needs to further judge the media components intended to be interacted in the established session according to the SDP description carried in the received INVITE message, and thus judges whether the service request is appropriate to be delivered to the CS network. In addition, in order to distinguish different service categories in the IMS more effectively, a mechanism that an IMS Communication Service Identifier is added into an IMS service request has been defined. Specifically, an IMS terminal or network element may add a special IMS Communication Service Identifier into an IMS service request to designate the service category of the current service request, for example, designate that a service is a normal IMS session or a Push to talk over Cellular (PoC) service. Therefore, the service category of the IMS service may be judged according to not only the method name of the IMS service request and/or the SDP description carried in the service request but also the special IMS Communication Service Identifier carried in the IMS service request. For the sake of concise description, the following embodiments are described by taking only judging according to the method name of the IMS service request and the SDP description carried in the IMS service request as an example. However, the multiple methods described above all are feasible.

Step 310: The I-CSCF queries a home HSS for the routing to a called user with a Diameter Location-Info-Request (LIR) message. The Diameter LIR message carries an NeDS query indication because it has been judged that the service category of the IMS service request being handled is appropriate to be delivered to the CS network for connecting the called user.

If the I-CSCF queries an NeDS entity set in the IMS through a Diameter interface, the NeDS entity and the HSS are usually integrated in one entity (hereinafter referred to as HSS/NeDS) and the route query and the network domain selection query are completed together with processes of querying for the route.

Step 320: The HSS/NeDS returns a Location-Info-Answer (LIA) message to the I-CSCF. Since the LIR message carries the NeDS query indication, in this step, the HSS/NeDS makes a terminating network domain selection before returning the LIA message, and carries the route information and the determination of the terminating network domain selection in the LIA message.

Step 330: After receiving the LIA message, the I-CSCF performs the subsequent delivering processes as follows according to the determination of the terminating network domain selection. If the selected terminating network domain is the IMS, the I-CSCF forwards the IMS service request to the S-CSCF (Choice 1 as shown in FIG. 3), the IMS service request is subsequently delivered to the called user in the IMS. If the selected terminating network domain is the CS network, the I-CSCF forwards the IMS service request to a Media Gateway Control Function (MGCF) (Choice 2 shown in FIG. 3), the IMS service request is subsequently delivered to the user in the CS network. (The subsequent delivering processes are the same as that in accordance with the related art and will not be described herein.)

Figure 4:
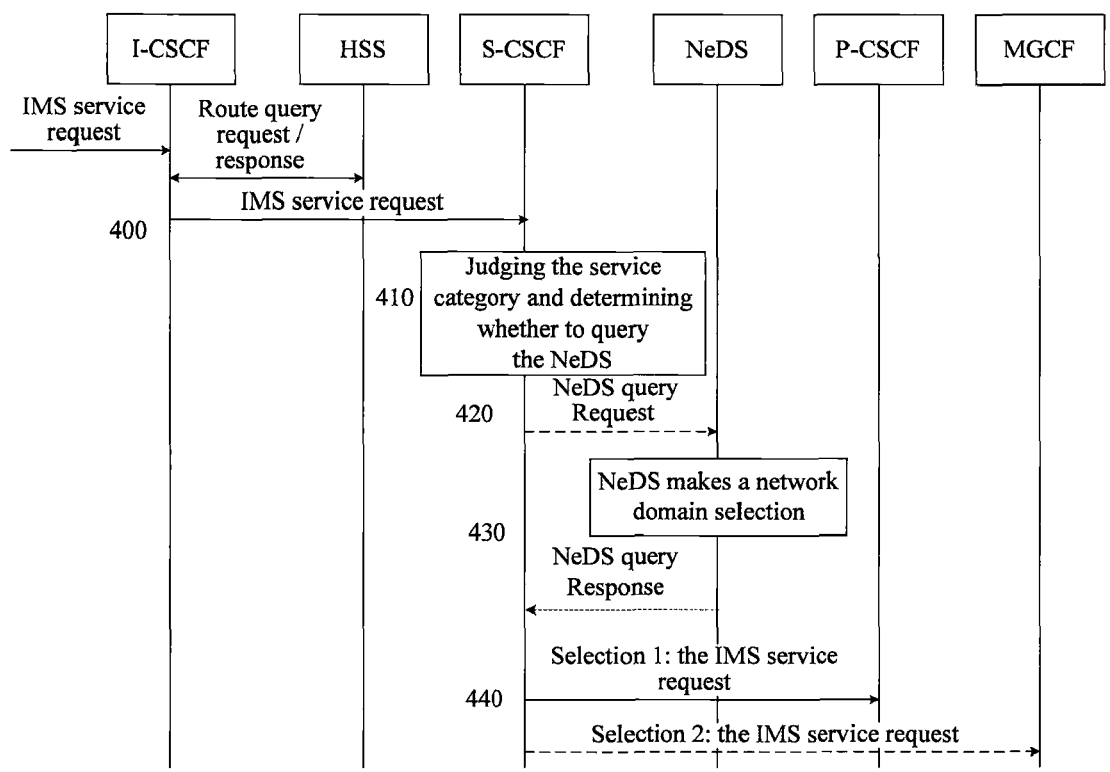

As shown in FIG. 4, the network domain selection query entity is an S-CSCF. The processes of performing the judging to accomplish the terminating network domain selection by the S-CSCF are described as follows.

Step 400: An I-CSCF in an IMS forwards an IMS service request to an S-CSCF assigned to a called user after receiving an IMS service request and performing a standard route query.

Step 410: The S-CSCF judges whether the IMS service request is appropriate to be delivered to the CS network for connecting the called user according to the service category of the IMS service request so as to determine whether an NeDS query is to be performed (In this embodiment, it is taken as an example that the query is to be performed).

Step 420: The S-CSCF sends a query message to an NeDS entity through a newly added Diameter interface so as to acquire a determination of the terminating network domain selection.

Step 430: The NeDS entity returns an NeDS query response message to the S-CSCF after making the terminating network domain selection.

Step 440: After receiving the NeDS query response message, the S-CSCF performs the subsequent delivering processes as follows according to the terminating network domain selection. If the terminating network domain determined by the terminating network domain selection is the IMS, the S-CSCF forwards the IMS service request to the corresponding P-CSCF (Choice 1 as shown in FIG. 4), the IMS service request is subsequently delivered to the called user in the IMS. If the terminating network domain determined by the terminating network domain selection is the CS network, the S-CSCF forwards the IMS service request to an MGCF (Choice 2 as shown in FIG. 4), the IMS service request is subsequently delivered to the called user in the CS network. (The subsequent delivering processes are the same as those in accordance with the prior art and will not be described herein.)

It is to be noted that in this embodiment, the NeDS is implemented as an independent entity, and accordingly the S-CSCF queries the NeDS through a newly added Diameter interface. In the case that the NeDS are integrated into an HSS, the above query is performed through an extended Cx interface since a Diameter protocol based Cx interface has been defined between the HSS and the S-CSCF but the functions of the original Cx interface cannot support the above query.

Figure 6:
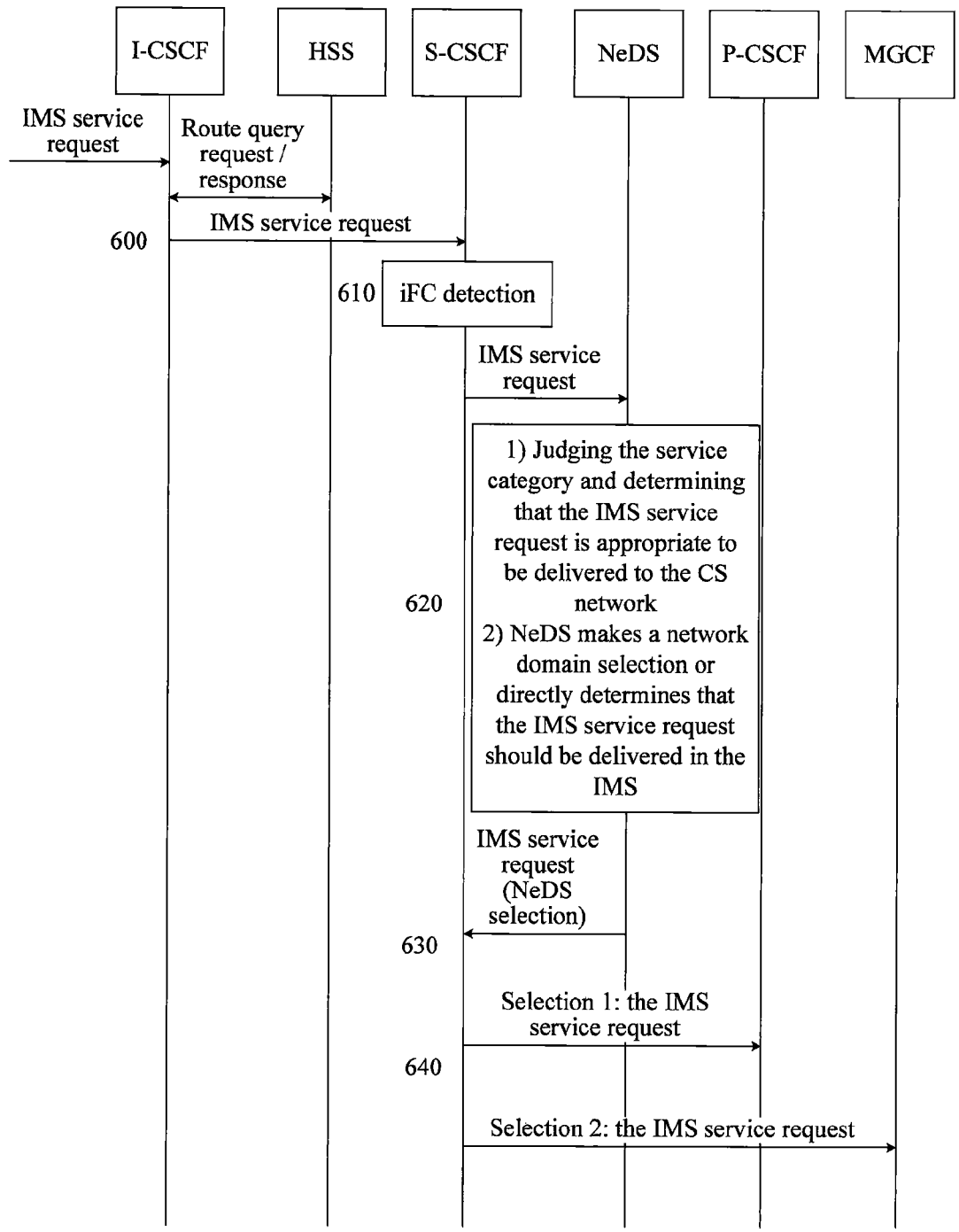

Similarly, no matter the NeDS is implemented as an independent entity or the NeDS is integrated into an HSS, after the S-CSCF triggers, according to the subscription data of a user, the service request to the AS controlling the terminating side service of the user in accordance with the prior art, the AS may also perform the above judging of the service category, implement the above query through the newly added Diameter interface or the extended Sh interface between the AS and the HSS according to the result of the judging, and then instruct the S-CSCF to perform the subsequent delivering processes according to the determination of the terminating network domain selection acquired. The basic processes of the above query are similar to the processes that the S-CSCF performs a query. The differences between the basic processes of the above query and the processes that the S-CSCF performs a query are that: an operation that the S-CSCF performs service triggering to the AS is added before Step 410; Steps 410 and 420 are performed by the AS; in Step 430, the NeDS returns the NeDS query response message to the AS, and the AS instructs, according to the determination of the terminating network domain selection in the received NeDS query response message, the S-CSCF to perform the subsequent routing processes of delivering the IMS service request in the IMS or to the CS network. The method for the AS to instruct the S-CSCF to perform the subsequent routing processes is similar to the case that the AS itself acts as the NeDS. Refer to Step 630 in the embodiment as shown in FIG. 6 for the details.

Figure 5:
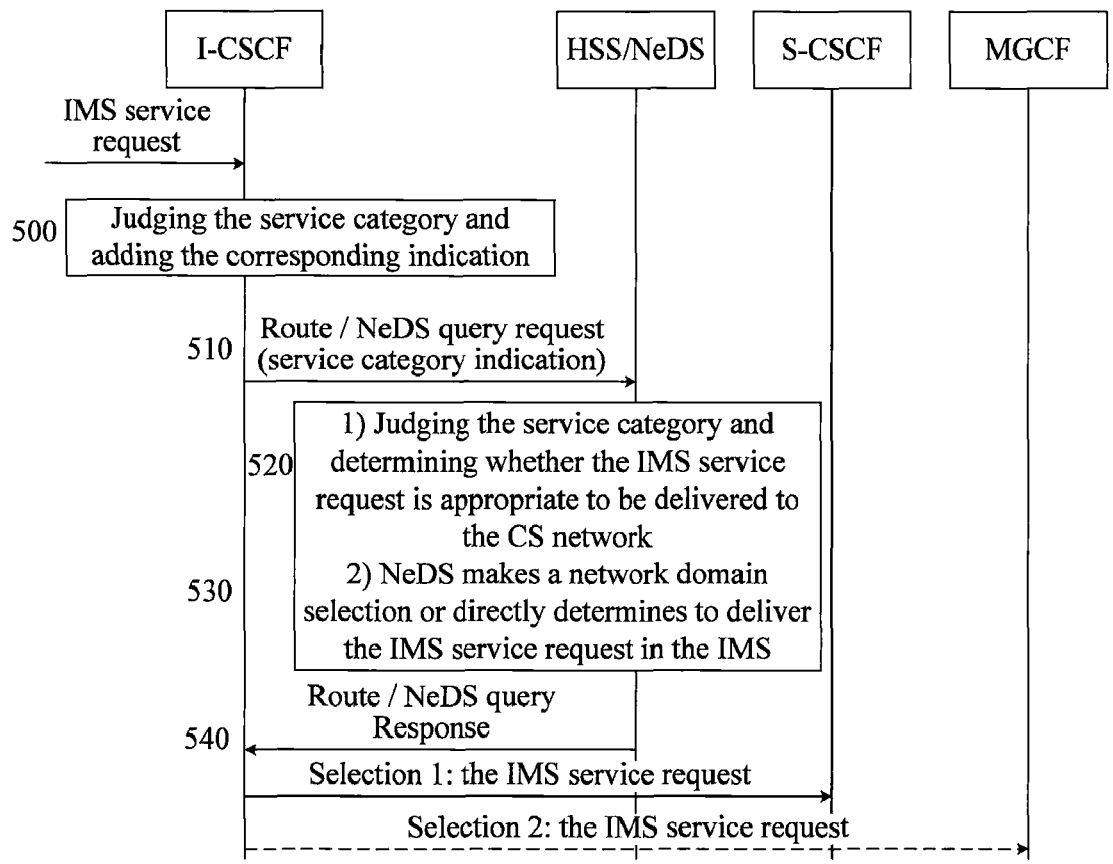

As shown in FIG. 5, the network domain selection query entity is an I-CSCF. The processes of determining a service category and making a terminating network domain selection according to the result of judging a service category by the network domain selection entity are described as follows.

Step 500: An I-CSCF determines a service category of an IMS service request according to a method name of the IMS service request and an SDP description carried in the IMS service request after receiving the IMS service request.

Step 510: The I-CSCF queries an HSS for the route of a called user through a Diameter LIR message and carries a service category indication in the Diameter LIR message (The NeDS is integrated into the HSS, hereinafter referred to as HSS/NeDS).

Step 520: Besides handling the routing query, the HSS/NeDS judges whether the IMS service request being handled is appropriate to be delivered to a CS network for connecting the called user according to the service category indication. If the IMS service request being handled is appropriate to be delivered to the CS network, the HSS/NeDS makes the terminating network domain selection according to various network domain selection related factors. If determining that the IMS service request being handled is not appropriate to be delivered to the CS network, the HSS/NeDS directly determines that the terminating network domain determined by the terminating network domain selection is the IMS without taking other factors into consideration.

Step 530: The HSS/NeDS returns a response message containing the route information and the determination of the terminating network domain selection to the I-CSCF.

Step 540: After receiving the response message, the I-CSCF performs the subsequent delivering processes as follows. If the terminating network domain determined by the terminating network domain selection is the IMS, the I-CSCF forwards the IMS service request to the S-CSCF (Choice 1 shown in FIG. 3), and the IMS service request is subsequently delivered to the user in the IMS. If the terminating network domain determined by the terminating network domain selection is the CS network, the I-CSCF forwards the IMS service request to a Media Gateway Control Function (MGCF) (Choice 2 shown in FIG. 3), and the IMS service request is subsequently delivered to the user in the CS network. (The subsequent delivering processes are the same as those in accordance with the prior art and will not be described herein.)

The service category indication of the IMS service request in the processes as shown in FIG. 5 is an indication determined and added by the I-CSCF according to a method name of the IMS service request being handled and an SDP description carried in the IMS service request being handled. The indication may be anyone of: VoIP session, video session, multimedia session containing a VoIP voice component, IMS session based messages, and IP bearer based short messages. Alternatively, the service category indication of the IMS service request is the received IMS service request or the abridgement of the received IMS service request encapsulated in an extended Diameter Attribute-Value Pairs (AVP) to be transferred to the HSS/NeDS.

As can be seen by comparing the above processes as shown in FIG. 4 and FIG. 5, the S-CSCF or the AS controlling the terminating side service of a user also may query the NeDS unconditionally, and carry a service category indication in an NeDS query message. The NeDS makes the terminating network domain selection according to the service category indication. The S-CSCF or AS instructs the S-CSCF to forward the IMS service request to a P-CSCF or an MGCF according to the information returned by the NeDS. The P-CSCF or MGCF performs the subsequent routing processes and the IMS service request is delivered to the called user in the IMS or to the CS network.

As shown in FIG. 6, the network domain selection query entity is an S-CSCF. The processes of judging the service category by the network domain selection query entity or the network domain selection entity and thus accomplishing the network domain selection are described as follows.

Step 600: An I-CSCF receives an IMS service request, queries an HSS for a route, and forwards an IMS service request to an S-CSCF assigned to a user according to the information returned by the HSS.

Step 610: The S-CSCF performs the detection of initial Filter Criteria (iFC) according to user's subscription data. That "the network domain selection query entity, S-CSCF, judges whether to query the NeDS according to the service category" may be implemented through the configuration of the iFC. In other words, the corresponding service triggering for performing the network domain selection query is performed for only the IMS service request appropriate to be delivered to the CS network, according to the configuration of the method (Method) and/or the SDP of the IMS service request in the iFC. If the above configuration for distinguishing service categories is not implemented in the iFC, the S-CSCF just forwards the IMS service request to the NeDS acting as an AS according to the matched iFC as shown in the FIG. 6.

Step 620: The NeDS judges the service category so as to determine whether the IMS service request is appropriate to be delivered to the CS network for connecting the called user. If determining that the IMS service request is appropriate to be delivered to the CS network, the NeDS makes a terminating network domain selection by further synthetically considering other network domain selection related factors. If determining that the IMS service request is not appropriate to be delivered to the CS network, the NeDS directly determines that the IMS service request is to be directly delivered in the IMS.

In this step, the judging processes may be omitted if the above configuration for distinguishing service categories has been implemented in the iFC in Step 610 and accordingly the NeDS will deem that the service requests triggered to the NeDS are all appropriate to be delivered to the CS network for connecting the called user.

Step 630: The NeDS indicates the determination of the terminating network domain selection through the returned IMS service request.

Specifically, if the NeDS judges that the service request should be delivered to the CS network, the NeDS modifies the destination identifier in the returned IMS service request, i.e., the Request-URI, into a virtual CS Domain Roaming Number (CSRN) in a Tel Uniform Resource Identifier (Tel-URI) format destined to the CS network (The composing of the CSRN should have a definite corresponding relation with the user number of the user in the CS network so as to enable a call delivered to the CS network subsequently to be routed normally in the CS network, for implementing which a mature result has been achieved in researches on VCC). Or, for a user in the CS domain in a GSM, CDMA, WCDMA or CDMA2000 system, the NeDS may first acquire the user's Mobile Station Roaming Number (MSRN) from the MSC/VLR of the CS domain through the HSS/HLR or according to the information acquired from the HSS/HLR, and then modifies the Request-URI into the user's MSRN in the Tel-URI format.

If the NeDS determines that the IMS service request should be delivered still in the IMS, the NeDS does not modify the destination identifier, i.e., the Request-URI, in the returned IMS service request.

If the NeDS determines that the service category of the IMS service request being handled is a multimedia session including a VoIP voice component and determines to split the multimedia session, the NeDS terminates the IMS service request received from the S-CSCF, and directly initiates two new service requests carrying different SDP descriptions and different destination identifiers, i.e., the Request-URIs, and sends the two new service requests to the S-CSCF. One of the two service requests contains only the VoIP voice component, and the Request-URI in the service request indicates that the IMS service request is to be delivered to the CS network. The other one contains the media components other than the VoIP voice component, and the Request-URI in the service request indicates that the service request is to be delivered in the IMS.

Step 640: The S-CSCF forwards the IMS service request to a P-CSCF or MGCF according to the Request-UIR in the IMS service request returned by the NeDS. The P-CSCF or MGCF performs the subsequent routing processes and the IMS service request is delivered to the called user in the IMS or to the CS network (as illustrated by Choice 1 or 2 shown in FIG. 6). In the case that the NeDS returns the two new service requests and thus indicates to split the session, the S-CSCF implements the subsequent delivering processes of the spitted sessions respectively according to the Request-URI in the two service requests.

A method similar to that in the embodiment shown in FIG. 5 may also be adopted in this embodiment, i.e., an S-CSCF implements the analysis of the service category of an IMS service request and forwards the IMS service request carrying the corresponding service category indication to an NeDS. However, since the NeDS in this embodiment may acquire all the information, the above method in this embodiment is the preferred one.

As shown in FIG. 7, one of the above network domain selection query entities in this embodiment includes: a receiving module 700, a judging module 701, a handling module 702, and a delivering module 703.

The receiving module 700 receives an IMS service request destined to a served user.

The judging module 701 judges whether the IMS service request is appropriate to be delivered to the CS network according to the service category of the IMS service request.

The handling module 702 queries for the determination of the network domain selection from the network domain selection entity in the case that the IMS service request is appropriate to be delivered to a CS network, and determines to directly deliver the IMS service request to a called user in the IMS in the case that the IMS service request is not appropriate to be delivered to the CS network.

The delivering module 703 delivers the IMS service request to the called user according to the acquired determination of the terminating network domain selection or directly delivers the IMS service request to the called user in the IMS.

As described above, the network domain selection query entity may be an I-CSCF, an S-CSCF, or an AS in the IMS.

As shown in FIG. 8, one of the above network domain selection entity in this embodiment includes: a receiving module 800, a judging module 801, a selection module 802 and a sending module 803.

The receiving module 800 receives a request for querying a determination of a terminating network domain selection.

The judging module 801 judges whether an IMS service request is appropriate to be delivered to the CS network according to the service category of the IMS service request.

The selection module 802 makes a current terminating network domain selection in the case that the IMS service request is appropriate to be delivered to the CS network, and directly determines to deliver the IMS service request to the called user in the IMS in the case that the IMS service request is not appropriate to be delivered to the CS network.

The sending module 803 sends the determination of the terminating network domain selection to the network domain selection query entity.

With the service capability difference between an IMS and a CS network being further taken into consideration on the basis of the solution in the prior art, it is ensured that the function of terminating network domain selection will not result in the service falling back or failure due to the capability difference between different networks. Thus, the function of terminating network domain selection, which may fully use the capabilities of different networks and terminals to provide users with better service experiences or implement more effective utilization of network resources for an operator, may be performed better.

It is obvious that those skilled in the art may make various modifications and alternations to the present disclosure without departing from the scope of the present disclosure. Thus, such modifications and alterations in the scope of the claims and the equivalent technologies thereof are intended to be contained in the present disclosure.

What is claimed is:

1. A method for making a terminating network domain selection, comprising:
   receiving an Internet Protocol Multimedia Subsystem (IMS) service request destined to a served user;
   judging whether the IMS service request is appropriate to be delivered to a Circuit Switched (CS) network according to a service category of the IMS service request;
   wherein the service category of the IMS service request is determined according to a method name of the IMS service request and a Session Description Protocol (SDP) description carried in the IMS service request; and the judging whether the IMS service request is appropriate to be delivered to the CS network according to the service category is implemented according to the method name of the IMS service request and the SDP description carried in the IMS service request;
   if the IMS service request is appropriate to be delivered to the CS network, making a terminating network domain selection and performing subsequent delivering processes according to determination of the terminating network domain selection.

2. The method of claim 1, further comprising:
if the IMS service request is not appropriate to be delivered to the CS network, omitting the terminating network domain selection, or making the terminating network domain selection as directly determining to deliver the IMS service request in the IMS.

3. The method of claim 2, wherein judging whether the IMS service request is appropriate to be delivered to the CS network according to the service category of the IMS service request comprises:
judging that the IMS service request is appropriate to be delivered to the CS network if the service category of the IMS service request is a service category of establishing a voice interaction of a Voice over IP (VoIP) service, or a service category of establishing a video interaction which can be converted into a CS video service, or a service category of establishing a multimedia interaction comprising a VoIP voice component.

4. The method of claim 2, wherein judging whether the IMS service request is appropriate to be delivered to the CS network is performed by a network domain selection query entity;
if the IMS service request is appropriate to be delivered to the CS network, the network domain selection query entity queries the network domain selection entity for the determination of the terminating network domain selection and performs subsequent service delivering processes according to the determination of the terminating network domain selection;
if the IMS service request is not appropriate to be delivered to the CS network, the network domain selection query entity directly delivers the IMS service request in the IMS.

5. The method of claim 2, wherein the judging whether the IMS service request is appropriate to be delivered to the CS network is performed by a network domain selection entity when a network domain selection query entity receives the IMS service request and queries the network domain selection entity for the determination of the terminating network domain selection;
if the IMS service request is appropriate to be delivered to the CS network, the network domain selection entity further makes the terminating network domain selection according to terminating network domain selection related factors;
if the IMS service request is not appropriate to be delivered to the CS domain network, the network domain selection entity directly determines that the terminating network domain is the IMS.

6. The method of claim 5, wherein the network domain selection query entity is an S-CSCF assigned to a called user; the S-CSCF forwards the received IMS service request to the network domain selection entity via an IP multimedia Service Control (ISC) interface to query for the determination of the terminating network domain selection.

7. The method of claim 6, wherein when the network domain selection entity judges that the IMS service request is used for establishing a multimedia interaction comprising a VoIP voice component, the network domain selection entity further instructs the S-CSCF to perform session splitting; the S-CSCF delivers the VoIP voice component to the CS network and delivers other components in the IMS according to the instruction.

8. The method of claim 5, wherein the network domain selection query entity is an I-CSCF at a network entrance, or an S-CSCF assigned to the called user, or an AS assigned to the called user; the S-CSCF, the I-CSCF or the AS sends a service category indication of the IMS service request to the network domain selection entity when querying the network domain selection entity for the determination of the terminating network domain selection, and the network domain selection entity judges whether the IMS service request is appropriate to be delivered to the CS network according to the service category indication of the IMS service request.

9. The method of claim 8, wherein the service category indication is a specific description of the service category determined by the network domain selection query entity according to the method name of the IMS service request and the SDP description carried in the IMS service request.

10. The method of claim 8, wherein the service category indication is the IMS service request or an abridgement of the IMS service request received by the network domain selection query entity.

11. A communication apparatus, comprising:
a receiving module, configured to receive an Internet Protocol Multimedia Subsystem (IMS) service request destined to a served user;
a judging module, configured to judge whether the IMS service request is appropriate to be delivered to a Circuit Switched (CS) network according to a service category of the IMS service request;
wherein the service category of the IMS service request is determined according to a method name of the IMS service request and a Session Description Protocol (SDP) description carried in the IMS service request; and the judging whether the IMS service request is appropriate to be delivered to the CS network according to the service category is implemented according to the method name of the IMS service request and the SDP description carried in the IMS service request;
a handling module, configured to acquire a determination of a terminating network domain selection in the case that the IMS service request is appropriate to be delivered to the CS network, and determine to directly deliver the IMS service request to a called user in the IMS in the case that the IMS service request is not appropriate to be delivered to the CS network; and
a delivering module, configured to deliver the IMS service request to the called user.

12. The communication apparatus of claim 11, wherein the communication apparatus is an Interrogating Call Session Control Function (I-CSCF), a Service CSCF (S-CSCF), or an Application Server (AS) in the IMS.

13. A communication apparatus, comprising:
a receiving module, configured to receive a terminating network domain selection query request;
a judging module, configured to judge whether an IMS service request destined to a served user is appropriate to be delivered to a Circuit Switched (CS) network according to a service category of the IMS service request carried in the terminating network domain selection query request;
wherein the service category of the IMS service request is determined according to a method name of the IMS service request and a Session Description Protocol (SDP) description carried in the IMS service request; and the judging whether the IMS service request is appropriate to be delivered to the CS network according to the service category is implemented according to the method name of the IMS service request and the SDP description carried in the IMS service request;
a selection module, configured to make a terminating network domain selection in the case that the IMS service request is appropriate to be delivered to the CS network, and directly determine to deliver the IMS service request to the called user in the IMS in the case that the IMS service request is not appropriate to be delivered to the CS network; and a sending module, configured to send the determination of the terminating network domain selection to an entity having sent the terminating network domain selection query request.

14. A network system, comprising:
a network domain selection apparatus, adapted to make a terminating network domain selection according to network domain selection related factors upon receiving a query request for the determination of the terminating network domain selection; and
a network domain selection query apparatus, adapted to judge a service category of an Internet Protocol Multimedia Subsystem (IMS) service request when receiving an IMS service request destined to a served user, query the network domain selection apparatus for a determination of the terminating network domain selection when determining that the IMS service request is appropriate to be delivered to a Circuit Switched (CS) network according to the service category, and perform the subsequent delivering processes of the IMS service request according to the determination of the terminating network domain selection;
wherein the service category of the IMS service request is determined according to a method name of the IMS service request and a Session Description Protocol (SDP) description carried in the IMS service request; and the judging whether the IMS service request is appropriate to be delivered to the CS network according to the service category is implemented according to the method name of the IMS service request and the SDP description carried in the IMS service request.

15. The network system of claim 14, wherein the network domain selection query apparatus is an Interrogating Call Session Control Function (I-CSCF) at the entrance of the IMS, a Service CSCF (S-CSCF) assigned to a called user, or an Application Server (AS) assigned to the called user.

16. The network system of claim 15, wherein the S-CSCF, I-CSCF or AS interacts with the network domain selection apparatus through a Diameter interface, or the S-CSCF interacts with the network domain selection apparatus through an IP multimedia Service Control (ISC) interface.

17. A network system, comprising:
a network domain selection query apparatus, adapted to query a network domain selection apparatus for a determination of a terminating network domain selection upon receiving an Internet Protocol Multimedia Subsystem (IMS) service request destined to a served user, and perform subsequent delivering processes of the IMS service request according to the determination of the terminating network domain selection; and
the network domain selection apparatus, adapted to judge whether the IMS service request is appropriate to be delivered to a Circuit Switched (CS) network according to a service category of the IMS service request, make a determination of the terminating network domain selection and provide the network domain selection query apparatus with the determination of the terminating network domain selection;
wherein the service category of the IMS service request is determined according to a method name of the IMS service request and a Session Description Protocol (SDP) description carried in the IMS service request; and the judging whether the IMS service request is appropriate to be delivered to the CS network according to the service category is implemented according to the method name of the IMS service request and the SDP description carried in the IMS service request.

18. The network system of claim 17, wherein the network domain selection query apparatus sends a service category indication of the IMS service request to the network domain selection apparatus when querying the network domain selection apparatus for the determination of the terminating network domain selection.

19. The network system of claim 17, wherein the network domain selection query apparatus is an Interrogating Call Session Control Function (I-CSCF) at the entrance of the IMS, a Service CSCF (S-CSCF) assigned to a called user, or an Application Server (AS) assigned to the called user.

20. The network system of claim 19, wherein the S-CSCF, I-CSCF or AS interacts with the network domain selection apparatus through a Diameter interface, or the S-CSCF interacts with the network domain selection apparatus through an IP multimedia Service Control (ISC) interface.

* * * * *